United States Patent
Prosser et al.

(10) Patent No.: US 11,422,713 B2
(45) Date of Patent: *Aug. 23, 2022

(54) MEMORY ERROR INDICATOR FOR HIGH-RELIABILITY APPLICATIONS

(71) Applicant: Micron Technology, Inc., Boise, ID (US)

(72) Inventors: Erika Prosser, Boise, ID (US); Aaron P. Boehm, Boise, ID (US); Debra M. Bell, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,797

(22) Filed: Jan. 25, 2021

(65) Prior Publication Data

US 2021/0149569 A1  May 20, 2021

Related U.S. Application Data

(63) Continuation of application No. 16/433,848, filed on Jun. 6, 2019, now Pat. No. 10,936,209.

(51) Int. Cl.
| | |
|---|---|
| *G06F 11/00* | (2006.01) |
| *G06F 3/06* | (2006.01) |
| *G06F 11/07* | (2006.01) |

(52) U.S. Cl.
CPC .......... *G06F 3/0619* (2013.01); *G06F 11/076* (2013.01)

(58) Field of Classification Search
CPC .............................. G06F 3/0619; G06F 11/076
See application file for complete search history.

(56) References Cited

U.S. PATENT DOCUMENTS

| | | | |
|---|---|---|---|
| 2004/0136250 A1* | 7/2004 | Takahashi | G11C 7/12 365/203 |
| 2015/0243373 A1* | 8/2015 | Chun | G06F 11/1076 714/710 |
| 2016/0239663 A1* | 8/2016 | Healy | G06F 21/554 |
| 2020/0066342 A1* | 2/2020 | Ha | G11C 7/04 |

* cited by examiner

*Primary Examiner* — Samir W Rizk
(74) *Attorney, Agent, or Firm* — Holland & Hart LLP

(57) ABSTRACT

Methods, systems, and devices for a memory error indicator related to high-reliability applications are described. A memory device may perform error detection procedures to monitor trends in the quantity of bit errors as an indication of the health of the memory device. A memory device may perform error detection procedures concurrently with refresh procedures to detect a quantity of errors (e.g., in a memory array) without degrading the performance of the device or the memory array. The memory device may compare a quantity of errors detected (e.g., in the memory array) with one or more previously detected quantities of errors to determine one or more differences in the quantities of errors. The memory device may generate an error metric based on the differences, and may determine whether the error metric satisfies a threshold. The memory device may output a status indicator (e.g., to a host device) based on whether the error metric satisfies the threshold.

20 Claims, 6 Drawing Sheets

MEMORY ERROR INDICATOR FOR HIGH-RELIABILITY APPLICATIONS

CROSS REFERENCE

The present Application for Patent is a continuation of U.S. patent application Ser. No. 16/433,848 by Prosser et al., entitled "MEMORY ERROR INDICATOR FOR HIGH-RELIABILITY APPLICATIONS," filed Jun. 6, 2019, assigned to the assignee hereof, and is expressly incorporated by reference in its entirety herein.

BACKGROUND

The following relates generally to a system that includes at least one memory device and more specifically to a memory error indicator for high-reliability applications.

Memory devices are widely used to store information in various electronic devices such as computers, wireless communication devices, cameras, digital displays, and the like. Information is stored by programing different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, such as DRAM devices, may lose their stored state over time and/or when disconnected from an external power source. In some cases, volatile memory cells may need to be periodically refreshed to maintain their state during normal operation.

In some cases, a memory device may be used within a system that is configured for or specifies a high level of reliability. Such systems may include, for example, automotive or other safety-related systems. The health of a memory device may physically degrade over time, however, which may cause bit errors in the memory device.

DETAILED DESCRIPTION

Figure 1:
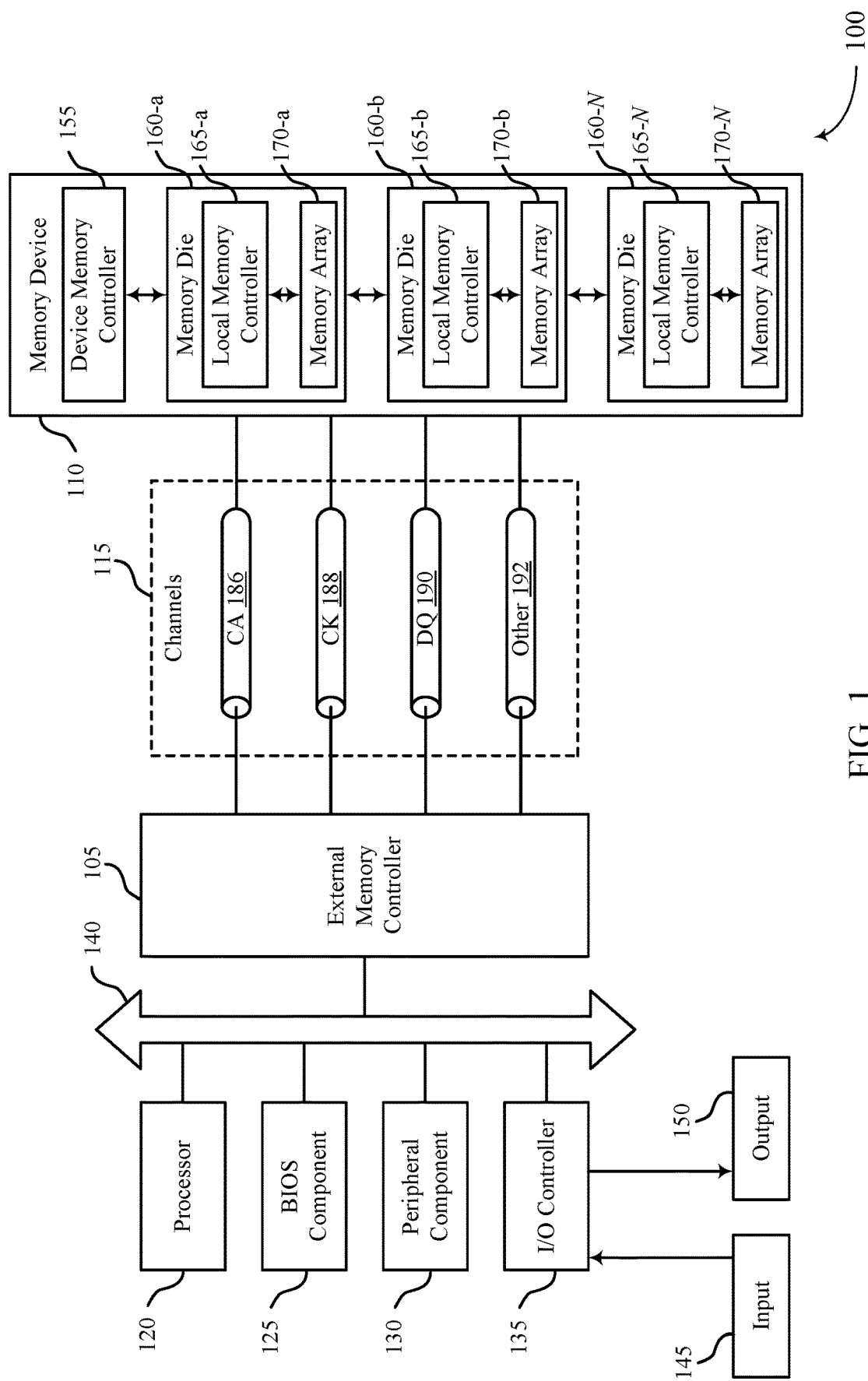
FIG. 1 illustrates an example of a system that supports a memory error indicator for high-reliability applications in accordance with examples as disclosed herein.

In some cases, a memory device may be used within a system that is configured for or specifies a high level of reliability. Such systems may include, for example, automotive or other systems in which safety may be implicated. A memory device may physically degrade over time due to various factors. Such degradation may increase a quantity of bit errors in the memory device. A bit error may be an error in which a logic value stored in a memory cell may be unintentionally changed from one logic state to another (e.g., from a logic one (1) to a logic zero (0), or vice versa. Such errors may be particularly problematic for these systems. Thus, in some cases, it may be desirable to monitor the health of a memory device to identify or predict degradation of the memory device before it reaches a significant or dangerous level.

In some cases, a memory device may perform error detection procedures to detect bit errors in a memory array. Such error detection procedures may include, for example, reading the logic state stored by memory cells on in the array and comparing the logic states to previously stored information about the logic states. In this manner, a memory device may be capable of determining a quantity of bit errors in a memory array; e.g., a quantity of bits that may have been changed from one logic state to another.

In some cases, an error detection procedure may be performed on a memory device before it is deployed in the field, as part of an initial verification process. This initial testing may be used to verify that the quantity of errors is below some maximum threshold, for example.

In some cases, the quantity of bit errors may begin to increase over time (e.g., over weeks, months, or years) as the memory device begins to degrade. In some cases, a memory device may be re-tested to determine whether the quantity of errors is still below the maximum quantity. Such testing with respect to an acceptable maximum may not provide an indication of the rate at which the memory device is degrading, however, or how the rate may be changing over time.

Some memory devices may perform error detection and correction procedures, such as error correction code (ECC) procedures, in which bit errors are detected and corrected. Such procedures may be helpful in reducing the impact of bit errors but may not provide an indication of the rate (or a change in the rate) at which the memory device may be degrading. Thus, procedures for detecting, estimating, or predicting a rate at which a memory device is degrading may be desirable.

In some cases, monitoring the change in the quantity of errors detected by successive error detection procedures may provide an early indication of the rate at which the memory device may be degrading, and therefore may indicate or predict the health of the memory device. In some cases, a memory device may monitor a trend in the quantity of errors based on successive error detection procedures performed at relatively frequent intervals, and may output a status alert (e.g., to an external device such as host device) if the trend indicates that the memory device may be degrading relatively quickly or may be approaching a critical health status.

In some cases, performing relatively frequent error detection procedures on a memory array may introduce undesirable overhead. For example, a memory device may be unable to perform other memory accesses on some or all of a memory array while the device is performing an error detection procedure.

In some cases, to reduce such overhead, a memory device may perform error detection procedures during a refresh procedure. A refresh procedure may be a procedure for reading and restoring (e.g., back to an originally stored level) the state of volatile memory cells to mitigate the potential loss of state information due to, for example, charge leakage. For example, some volatile memory cells, such as DRAM cells, include a capacitor for storing the state of the memory cell, and such memory cells may need to be periodically refreshed to compensate for charge leakage from the capacitor over time. A memory device may therefore reserve certain time periods, sometimes referred to as refresh cycles, for performing the refresh procedures, during which some of all of the memory array may be refreshed and may not be available for other memory access operations. Additionally or alternatively, the normal operation of the memory device may include a quantity of refresh commands received by the device within a certain time period, and as such the time for such refresh cycles may be considered part of the normal memory device timing.

In some cases, a memory device may be configured to refresh the logic state of a memory cell each time the memory cell is read, to compensate for charge loss that may occur as part of the read operation. In some cases, a memory device may perform an error detection procedure during the read operation.

By performing error detection during refresh procedures and/or during read operations, a memory device may be capable of monitoring trends in the quantity of errors detected in the memory array without disturbing or degrading the normal operation of the memory device.

Features of the disclosure are initially described in the context of a memory system and memory die as described with reference to FIGS. 1 and 2. Features of the disclosure are described in the context of a system as described with reference to FIG. 3, which is further illustrated by examples in FIG. 4. These and other features of the disclosure are further illustrated by and described with reference to an apparatus diagram and flowcharts that relate to a memory error indicator for high-reliability applications as described with references to FIGS. 5-6.

FIG. 1 illustrates an example of a system 100 that utilizes one or more memory devices in accordance with examples as disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include portions of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be a component of the system configured to store data for one or more other components of the system 100. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card.

In some cases, a host device may receive, from memory device 110, a status indicator that indicates the health of memory device 110. The status indicator may provide an indication of a rate (or a change of a rate) at which memory device 110 is degrading over time, for example, or may provide an indication that memory device 110 is approaching or has reached a critical level of degradation. In some cases, a host device may, based on a status indicator received from memory device 110, perform various tasks or change various operational characteristics associated with system 100. For example, a host device may switch to a different memory device, or may store system state information in a different memory device, or may reduce a clock speed at which memory device 110 is operated, or may transmit a notification to another device, for example.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or specialized graphics ports. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another or next to one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel.

In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be ×4 (e.g., including four signal paths), ×8 (e.g., including eight signal paths), ×16 (including sixteen signal paths), and so forth. Signals communicated over the channels may use double data rate (DDR) signaling. For example, some symbols of a signal may be registered on a rising edge of a clock signal and other symbols of the signal may be registered on a falling edge of the clock signal. Signals communicated over channels may use single data rate (SDR) signaling. For example, one symbol of the signal may be registered for each clock cycle.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include any quantity of signal paths to decode address and command data (e.g., eight or nine signal paths).

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110.

In some cases, the channels 115 may include one or more other channels 192 that may be dedicated to other purposes. These other channels 192 may include any quantity of signal paths.

In some cases, the other channels 192 may include one or more error detection code (EDC) channels. The EDC channels may be configured to communicate error detection signals, such as checksums, to improve system reliability. An EDC channel may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and/or others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

Figure 2:
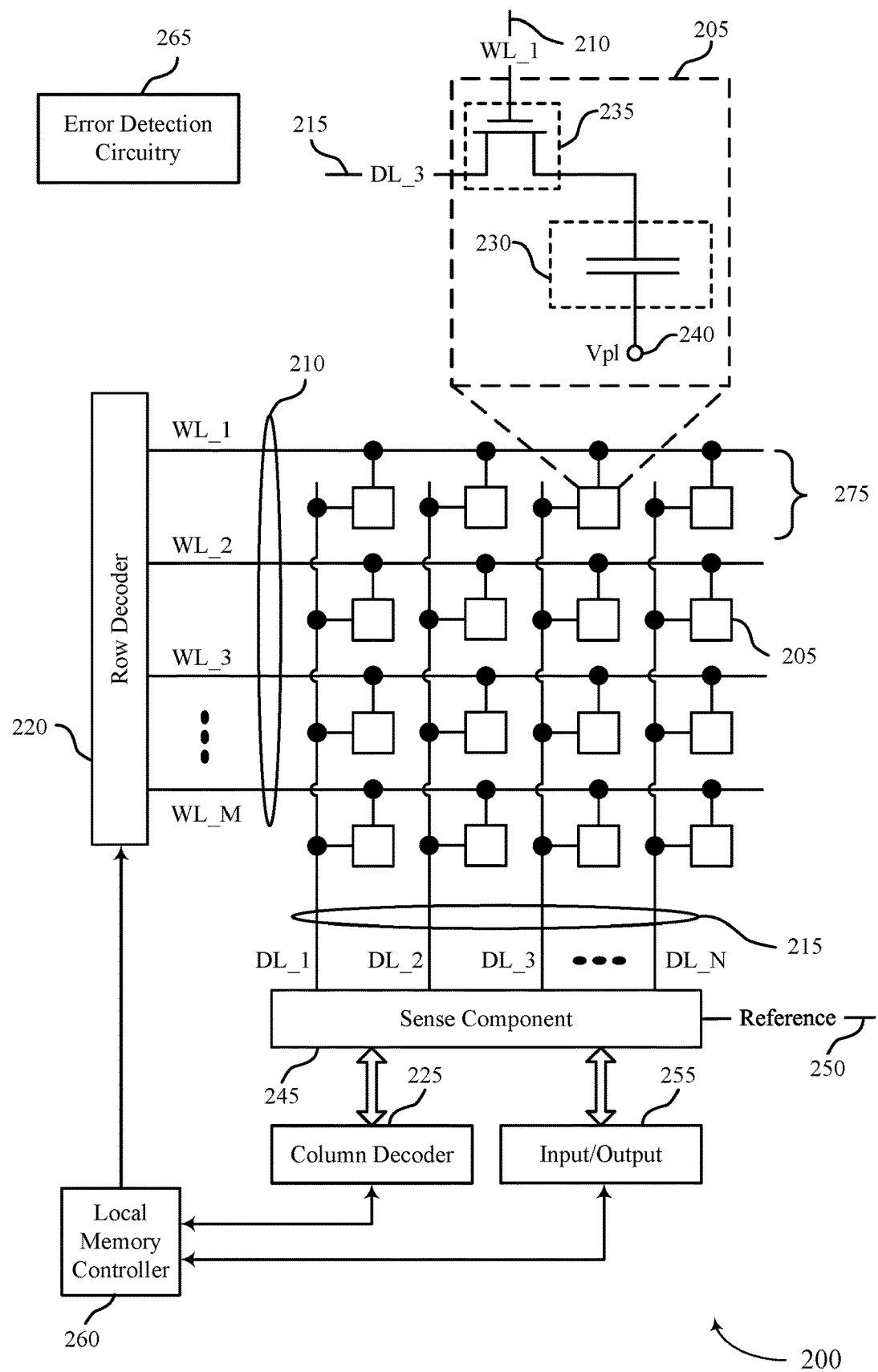
FIG. 2 illustrates an example of a memory die that supports a memory error indicator for high-reliability applications in accordance with examples as disclosed herein.

FIG. 2 illustrates an example of a memory die 200 in accordance with examples as disclosed herein. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. Thus, each word line 210 may be coupled with a row 275 of memory cells 205. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Vpl, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals. In some cases, the sense component 245 may restore the digit line 215 to a voltage that reflects the stored state of memory cell 205 (e.g., restored to a voltage that is the same or similar to a write operation). The detected logic state of the memory cell 205 may be provided as an output of the sense component 245 (e.g., to an input/output 255), and may indicate the detected logic state to another component of a memory device 110 that includes the memory die 200, such as a device memory controller 155 (e.g., directly or using the local memory controller 260).

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, activation of a word line in DRAM architectures may partially or completely discharge the capacitor of the target memory cell. The sense component 245 may restore the voltage on the digit line 215 according to the sensed logic state, which may restore the voltage on the memory cell 205 to a same or similar voltage as used in the write operation.

In some memory architectures based on volatile memory cells, such as DRAM, the state of a memory cell 205 may need to be periodically refreshed to maintain the state of the memory cell 205 when the memory cell 205 is not accessed for a period of time (and therefore is not restored as part of a read or write operation). Thus, memory die 200 may include logic circuitry that may be configured to periodically perform a refresh procedure on memory cells 205 of one or more rows 275 by reading and restoring (e.g., firing sense component 245 to amplify the voltage on the memory cells 205 back to the originally written voltage levels) the states of the memory cells 205. In some cases, such logic circuitry may be part of local memory controller 260 or may be separate circuitry. In some cases, memory die 200 may perform a refresh procedure on memory cells 205 of one or more rows 275 in response to receiving a refresh command from an external host device or based on internal timing that specifies a frequency with which memory cells 205 may be refreshed.

Memory die 200 may include error detection circuitry 265 for detecting a quantity of errors in a memory array of memory die 200. Error detection circuitry 265 may detect the quantity of errors using an error detection algorithm. For example, error detection circuitry 265 may detect the quantity of errors using an error detection algorithm (e.g., an error detection procedure) that reads the states of memory cells 205, generates a code representing the combined states of memory cells 205, and compares the generated code with a code previously stored on memory die 200, for example. In some cases, error detection circuitry 265 may detect errors without correcting the errors.

In some cases, memory die 200 may be configured to detect a quantity of errors in the memory array during a refresh cycle. For example, memory die 200 may perform a refresh procedure on memory cells 205 of one or more rows 275 during a refresh cycle, and may, concurrently or serially, perform an error detection procedure on the same memory cells 205 of the rows 275 during the refresh cycle.

In some cases, memory die 200 may be configured to compare the detected quantity of errors with a previous quantity of errors detected for the same memory cells 205 and determine a difference between the two detected quantities of bit errors. Memory die 200 may be configured to generate an error metric based on the difference and determine whether the error metric satisfies a threshold. The error metric may represent an error trend, for example. Memory die 200 may output a status indicator based on the determination of whether the error metric satisfies the threshold.

Figure 3:
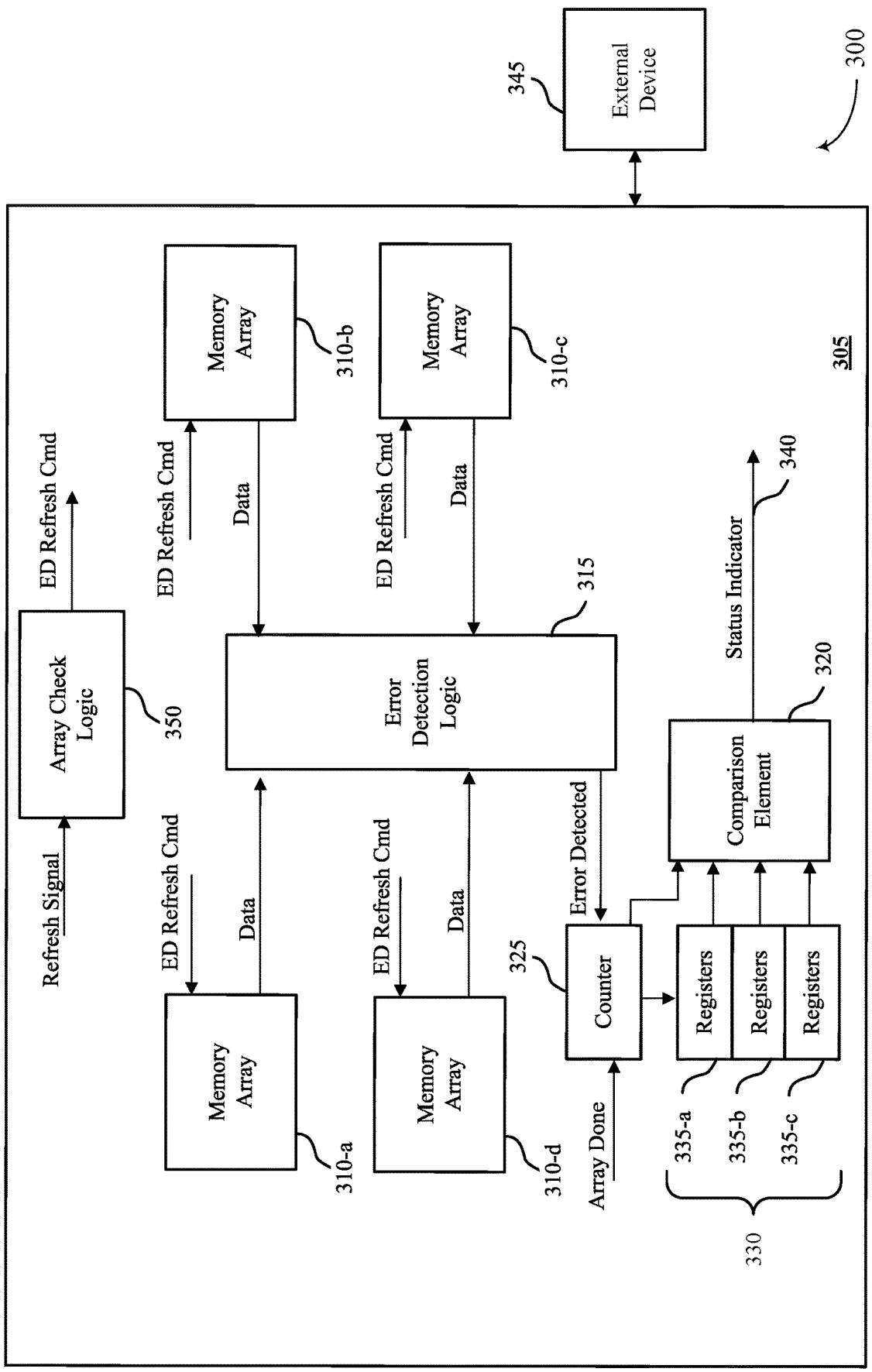
FIG. 3 illustrates an example of a system that supports a memory error indicator for high-reliability applications in accordance with examples as disclosed herein.

FIG. 3 illustrates an example of a system 300 that supports a memory error indicator for high-reliability applications in accordance with examples as disclosed herein. System 300 depicts example components and signaling that may be used to support a memory error indicator for high-reliability applications; other implementations, including other components or signals, may be used without departing from the scope of the disclosure.

System 300 may include a memory die 305, which may be an example of memory die 200 described with reference to FIG. 2. Memory die 305 may be in electronic communication with one or more external devices 345, which may include, for example, a host device configured to manage memory accesses to memory die 305 from other components in a larger system.

Memory die 305 may include one or more memory arrays 310-a, 310-b, 310-c, 310-d. Such memory arrays 310 may be or may include arrays of volatile memory cells, such as DRAM memory cells. Some volatile memory cells may lose their state over time and may be periodically refreshed (e.g., read and restored) to maintain their state. In some cases, volatile memory cells may be characterized in terms of the frequency with which they may need to be refreshed to maintain their state, which may be referred to as a refresh interval. A memory die 305 may periodically perform refresh procedures on one or more rows of memory cells of a memory array to maintain the state of the memory cells.

In some cases, a memory die 305 may refresh one or more rows of a memory array 310 in response to receiving a refresh command from an external device 345 (such as a host device), which may be referred to as performing an auto refresh procedure. The external device 345 may transmit the refresh command to the memory die 305 based on timing information maintained at the external device 345, for example.

In some cases, a memory die 305 may refresh one or more rows of a memory array 310 based on internal (e.g., on-die) timing that indicates the amount of time that has elapsed since a row of memory cells was last read or refreshed, which may be referred to as performing a self-refresh procedure. A memory die 305 or memory device may include an on-board oscillator for monitoring the elapsed time since a previous refresh operation, for example. In another example, the on-board oscillator may be used to generate row refreshes at a given periodicity that results in a desired refresh rate for the memory array 310.

Traditionally, refresh procedures may not capture the logic state of the memory cells when the cell is read and restored during a refresh procedure. That is, refresh procedures may generally perform operations to read and restore the state of memory cells without performing any additional processing on the logic states. For example, in some cases, performing a refresh procedure on a row of memory cells of a memory array may include performing a read and restore procedure that includes performing an activate (Act) operation on the row to activate the row and cause the memory cells to be read and restored (e.g., by sense amplifiers), and then performing a pre-charge (Pre) operation on the digit lines to prepare for the next access operation and return the digit lines to a pre-charged state for the next row activation. Such a sequence may be referred to as an Act/Pre sequence. In some cases, the activate operation may cause a word line associated with the row of memory cells to be activated (e.g., asserted), thereby selecting memory cells coupled with the word line. The selected memory cells may charge share with corresponding digit lines, thereby changing the voltage on the digit lines based on the logic state stored by the memory cell. Sense amplifiers that are coupled with the digit lines may drive the digit lines to one of two values based on the voltage on the digit line, causing the memory cells to be restored to the full charge associated with the logic state (e.g., refreshed). The pre-charge operation may cause the digit line to be biased to a pre-charge voltage to prepare the digit line for a subsequent access operation. In some cases, during a refresh procedure, the sense amplifiers may not save or output the logic states of the memory cells, as would typically be done during a read access operation.

Some memory devices may be configured to perform error detection procedures to internally detect data corruption or errors by comparing the logic states (e.g., during a read operation) to information stored on the memory device. Such error detection procedures may rely upon one or more error-correcting codes (ECCs) (e.g., block codes, convolutional codes, Hamming codes, low-density parity-check codes, turbo codes, polar codes), and related processes or operations to detect or correct errors in a memory array 310. In some cases, error detection or correction information generated using such codes may be stored in the rows of the memory array when the rows are written, and may subsequently be retrieved during a read operation by the sense amplifiers and output to error detection logic and compared with information generated using data that is concurrently read (e.g., from the same rows).

Error detection techniques (which may in some cases also include error correction) may be referred as ECC processes, ECC operations, ECC techniques, or in some cases as simply ECC. Error detection conducted internally within a memory device on data stored previously at the memory device may generally be referred to as internal or on-die ECC (whether within a single-die memory device or a multi-die memory device), to distinguish from error detection performed on the memory device by an external device, or error detection performed on data transmitted between devices to compensate for errors that may occur during transmission, for example. Memory devices that support internal or on-die ECC may be referred to as ECC memory or on-die ECC memory.

According to various aspects, a memory die 305 may be configured to perform an error detection procedure, such as an ECC procedure, concurrently with a refresh procedure (or other read and restore procedure). In this case, a memory die 305 may capture the logic states of the memory cells during the refresh procedure, such as by outputting latched values from the sense amplifiers to error detection logic. In some cases, a memory die 305 may perform a combined error detection and refresh procedure by issuing an internal error detection (ED) refresh command to one or more memory arrays on memory die 305. In some cases, an ED refresh command may include a read or latch operation in addition to the refresh operations to capture the logic states of the memory cells when they are refreshed.

Returning to the previous example, an ED refresh command for a DRAM device may include an activate operation, a read operation (to capture the logic state), and a pre-charge operation, which may be represented as an Act/Rd/Pre command. In this case, the read operation (Rd) may be inserted between the two operations (Act and Pre) that make up a refresh command to output the logic states of the memory cells from the sense amplifiers to the error detection logic during the refresh procedure. Different memory architectures or memory cell technologies may use different operations for reading and refreshing memory cells; thus, some ED refresh commands may include different operations (e.g., other than Act, Rd, and/or Pre) for performing concurrent error detection and refresh procedures.

In some cases, memory die 305 may include array check logic 350 that may be configured to initiate an error detection and refresh procedure in response to receiving a refresh signal. The refresh signal may include a refresh command from an external device (e.g., for auto-refresh) or a signal from internal timing logic (e.g., for self-refresh), for example. The array check logic 350 may initiate the error detection and refresh procedure by outputting an ED refresh command to one or more memory arrays 310 to cause the memory arrays 310 to perform the error detection and refresh procedure. The ED refresh command may include a row address on which to perform the error detection and refresh procedure. In some cases, a row decoder associated with the memory array 310 may activate a word line for the refresh procedure based on the row address.

In some cases, a memory array 310 may, in response to receiving an ED refresh command, perform a refresh procedure on memory cells of the specified row of memory array 310 and may output data, such as the logic states of memory cells in the row, to error detection logic 315. Error detection logic 315 may be configured to detect errors based on error detection information that may be stored in the rows of the memory device, stored in latches or registers that are not part of the rows of the memory device, and/or received from a host device, such as error detection information that includes a parity bit, cyclic redundancy check (CRC) code, error-correcting code (ECC), or other error detection information.

Error detection logic 315 may be configured to transmit, based on detecting an error, a signal indicating that an error has been detected (e.g., or a quantity of errors detected in a given row) to a counter 325. In some cases, counter 325 may increment each time (e.g., each occurrence) error detection logic 315 detects an error. Thus, counter 325 may be used to count a quantity of errors detected in a memory array 310 during an error detection and refresh procedure.

In some cases, after all, or most, or some minimum quantity of the rows of a memory array 310 have been refreshed, indicating that error detection and refresh procedures have been performed on a sufficient quantity of rows of the memory array 310 to determine a quantity of bit errors (e.g., on the full memory array 310 or an acceptable subset of memory array 310), memory die 305 may generate a signal indicating that the array is done. In some cases, memory die 305 may generate a signal indicating that the array is done after the error detection and refresh procedures have been performed on a memory array 310 two or more times; for example, a memory die 305 may loop through a memory array 310 multiple times before activating the signal indicating that the array is done. In some cases, the signal indicating that the array is done may be provided to counter 325 to indicate that the total quantity of errors in a memory array 310 has been counted, at which time the counter 325 may contain a quantity of bit errors detected in the rows of a memory array 310.

In some cases, a memory device may perform error detection and refresh procedures on a full memory array 310 in response to receiving a single refresh signal, such as a refresh command. In some cases, a memory device may perform error detection and refresh procedures on the full memory array 310 in response to receiving multiple refresh signals. In this case, the memory device may refresh a subset of the rows of the memory array 310 in response to each refresh signal, and may intersperse other memory access procedures, such as read and write operations, with performing the error detection and refresh procedures.

In some cases, memory die 305 may include a buffer 330 for maintaining a history of quantities of bit errors detected during previous error detection and refresh procedures. Each time a new quantity of bit errors is detected for the full array of memory cells, the new quantity may be shifted into a first register 335-a of buffer 330, with previous quantities of bit errors shifted down to other registers 335-*b*, 335-*c*. In some cases, buffer 330 may be a first in, first out (FIFO) buffer.

In some cases, counter 325 may, based on receiving the signal indicating that the array is done, output the quantity of bit errors to a comparison element 320. Comparison element 320 may be configured to compare the quantity of bit errors received from counter 325 (e.g., the most recently detected quantity of bit errors) with one or more previous quantities of bit errors stored in the registers 335 of buffer 330 to determine one or more differences in the quantity of bit errors.

For example, comparison element 320 may compare the quantity of bit errors received from counter 325 with a previous quantity of bit errors stored in register 335-*a* to determine a first difference in the quantity of bit errors. A relatively small difference may indicate that the memory device has probably experienced minimal degradation, while a larger difference may indicate that the memory device has experienced greater degradation, for example. In some cases, comparison element 320 may also compare the quantity of bit errors received from counter 325 with additional previous quantities of bit errors stored in registers 335-*b* and 335-*c* to determine second and third differences in the quantities of bit errors, and/or may compare previous quantities of bit errors stored in registers 335-*b* and 335-*c* to determine other differences in the quantities of bit errors. Such comparisons may provide an indication of the rate at which the quantity of bit errors is changing over time. In some cases, such comparisons and differences may be used to identify a linear or non-linear (e.g., polynomial) trend line in successive quantities of errors, such as by using a best-fit analysis such as a least-squares analysis or regression analysis.

In some cases, comparison element 320 may be configured to generate an error metric based on one or more of the differences in the quantity of errors. For example, comparison element 320 may generate an error metric based on some or all of the first difference, the second difference, and/or the third difference described above (or additional differences). In some examples, comparison element 320 may generate an error metric by comparing a most recent difference (e.g., a difference between the most recent quantity of bit errors and the immediately preceding quantity of bit errors) with one or more older differences (e.g., a difference between the most recent quantity of bit errors and one or more earlier quantities of bit errors, or between the earlier quantities of bit errors). In some cases, the error metric may provide an indication of a change or trend (e.g., a change in the change) in the quantity of bit errors detected in a memory array, and may thereby provide an indication of a rate at which the memory device may be degrading.

Figure 4:
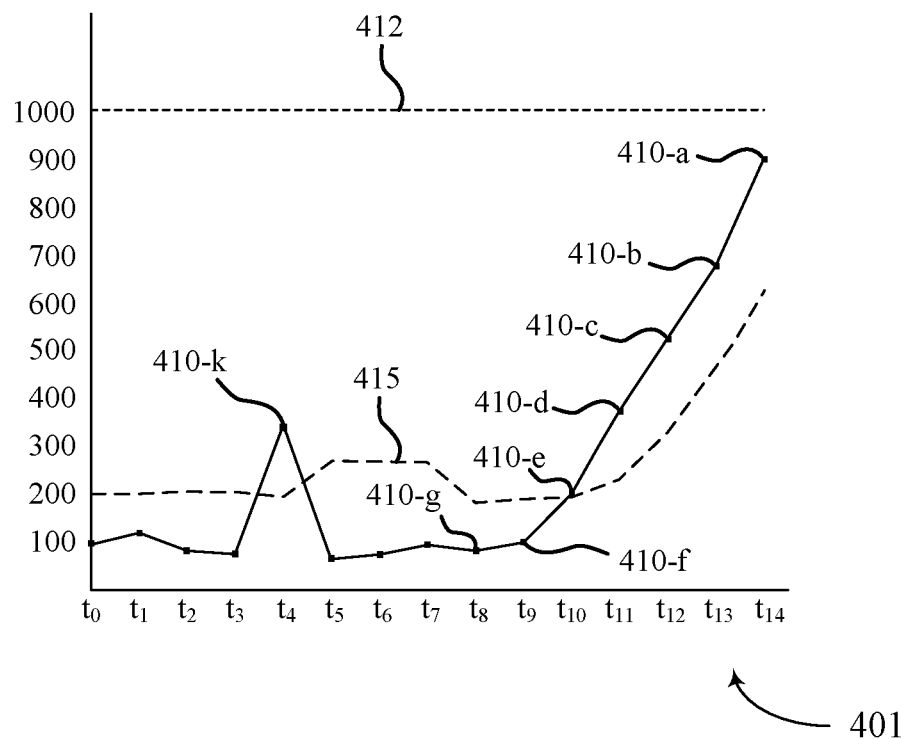
FIG. 4 depicts examples that illustrate a memory error indicator for high-reliability applications in accordance with examples as disclosed herein.
Figure 4:
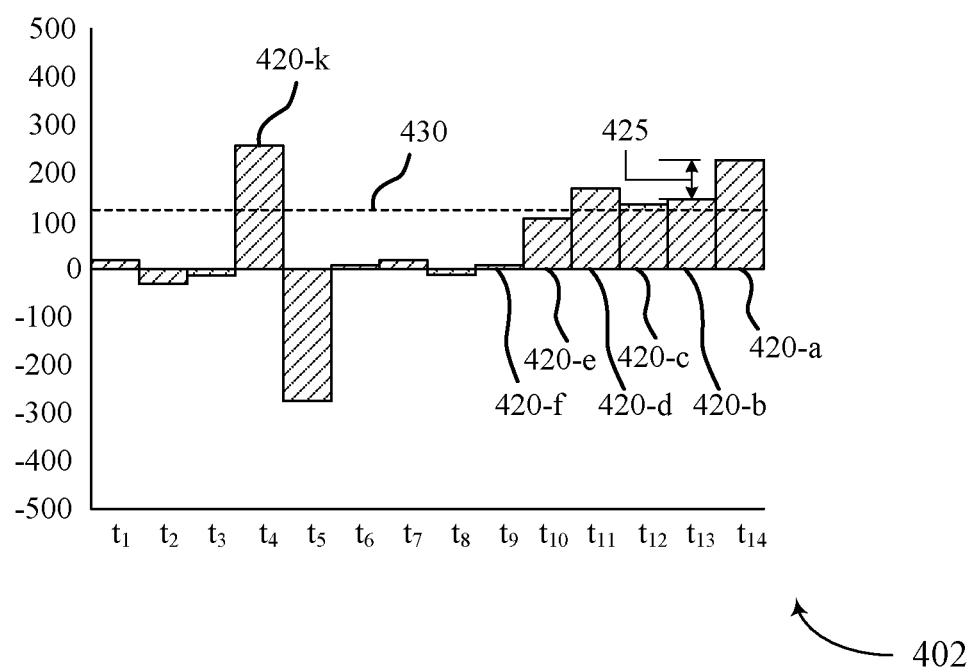

In some cases, comparison element 320 may be configured to determine whether the error metric satisfies a threshold. The threshold may be, for example, a maximum value of the difference between detected quantities of bit errors, or a maximum value for a rate of change in the differences between multiple successive detected quantities of bit errors, for example. FIG. 4 depicts an example of generating an error metric based on various differences.

In some cases, comparison element 320 may be configured to output a status indicator 340 based on whether the error metric satisfies the threshold. For example, comparison element 320 may output a first status indicator if the error metric satisfies the threshold, and may output a second, different status indicator (or may not output a status indicator) if the error metric does not satisfy (e.g., fails to satisfy) the threshold. Comparison element 320 may use any quantity of thresholds and output corresponding status indicators based on the error metric satisfying one or more thresholds. For example, comparison element 320 may output a third, different status indicator if the error metric satisfies a second threshold. In this manner, comparison element 320 may provide an indication of the health of the memory device to, for example, an external host device. For example, the comparison element 320 may output the status indicator by transmitting the status indicator 340 to an external host device and/or by storing the status indicator in a register on the memory device that may subsequently be read by an external host device.

In some cases, comparison element 320 may include one or more comparator circuits (e.g., comparators) having inputs coupled with counter 325 and one or more registers 335 of buffer 330. The comparator circuit(s) may be configured to determine one or more differences between a quantity of bit errors received from counter 325 and previously detected quantities of bit errors received from, for example, registers 335-*a*, 335-*b*, 335-*c*. In some cases, the comparator circuits may be configured to determine whether a difference in quantities of bit errors satisfies a threshold (which may be stored at the comparator circuit) and output a signal based on the determination. For example, a comparator circuit may output a "1" if the difference satisfies the threshold and a "0" if the difference does not satisfy the threshold. In some cases, a single comparator circuit may serially compare the difference between the quantity of bit errors in counter 325 with each of the quantities of bit errors in registers 335-*a*, 335-*b*, 335-*c* or a difference between quantities of bit errors in two or more registers 335-*a*, 335-*b*, and/or 335-*c* (e.g., differences, average of differences) to determine whether the change in differences satisfies a threshold and output successive signals based on each of the comparisons.

In some cases, comparison element 320 may include multiple comparator circuits that may be used to perform the multiple comparisons, with each comparator circuit potentially set to a different threshold and configured to output a signal indicating whether the difference satisfies the respective threshold.

In some cases, a comparator circuit may be configured to output a difference, or a magnitude of a difference, in quantities of bit errors instead of or in addition to outputting a signal indicating whether the difference satisfies the threshold. In some cases, the comparison element 320 may be configured to output a status indicator 340 based on one or more outputs of the comparator circuits.

In some cases, comparison element 320 may filter the results of the comparisons based on various criteria. For example, in some cases, comparison element 320 may assign a weight to each quantity of bit errors or difference between quantities of bit errors, and may generate the error metric based on the weighted quantities or differences. For example, comparison element 320 might weight the most recent difference—e.g., the difference between the most recently detected quantity of bit errors in counter 325 and an immediately preceding quantity of bit errors in register 335-*a*—more heavily than older differences, such as a difference between the quantity of bit errors in register 335-*b* and an older quantity of bit errors in register 335-*c*. Thus, for example, the error metric may be more affected by recent changes in the quantity of bit errors than by older changes in the quantity of bit errors. Other types of weightings may be used without departing from the scope of the disclosure.

In some cases, a particular error detection and refresh procedure may detect an unusually high or low quantity of bit errors relative to one or more previously detected quantities of bit errors. In some cases, these quantities of bit errors may be considered outlier quantities of bit errors, and may be the result of transient device behavior or glitches, for example. Thus, the difference between an outlier quantity of errors and one or more previously detected quantities of errors may not accurately represent the health of the memory device. Thus, in some cases, comparison element 320 may be configured to determine that quantity of bit errors or a difference between quantities of bit errors satisfies a condition for being an outlier relative to one or more other quantities of bit errors or differences (respectively), and may generate the error metric independently of the outlier quantity or difference. That is, the comparison element 320 may be configured to filter an outlier quantity of bit errors or an outlier difference and generate the error metric without including (e.g., excluding) the outlier quantity or difference. In some cases, the condition for being an outlier may include satisfying a threshold change (e.g., a minimum or maximum change) in the quantity or difference between the outlier quantity or difference and other quantities or differences, for example.

While the description above focuses on performing error detection during a refresh procedure, an analogous approach may be used to detect errors during other read procedures or other read and restore procedures, such as read operations, by comparing the retrieved logic states with information stored on the memory device in the same manner as described with reference to the error detection and refresh procedure. Such an approach may provide a similar benefit in that the error detection may be performed without disturbing the normal operation of the memory device.

In some cases, if a sufficient quantity of rows of a memory array are read (e.g., during multiple read operations), the error detection logic 315 and counter 325 may be able to count or estimate the quantity of bit errors in the full memory array based on the logic states retrieved from the memory cells during the read operations. In this case, the error metric may be generated when the quantity of accessed rows satisfies a threshold quantity of rows, which may be a minimum quantity for detecting a quantity of bit errors with a desired accuracy.

FIG. 4 shows a first example 401 of quantities of bit errors and a second example 402 of differences in quantities of bit errors that may illustrate features of a memory error indicator for high-reliability applications in accordance with the disclosure herein.

Example 401 may depict a plot of multiple quantities of bit errors, including 410-a, 410-b, 410-c, 410-d, 410-e, 410-f, 410-g, that may be detected at times t0 thorough t14. Some or all of quantities of bit errors 410 may be stored in a counter 325 and registers 335, such as described with reference to FIG. 3. For example, at time t14, the quantity of bit errors 410-a may have been measured and stored in counter 325, while quantities of bit errors 410-b, 410-c, and 410-d may be stored in registers 335-a, 335-b, and 335-c, respectively. In other implementations, different quantities of quantities of bit errors may be stored (e.g., in additional registers 335).

In some cases, quantities of bit errors detected between times t0 and t9 may be fairly similar, indicating fairly stable memory device behavior and a low likelihood of memory degradation. The exception here is quantity of bit errors 410-k, which may be identified as an outlier quantity of bit errors because it is substantially different than both the immediately preceding and immediately following quantities of bit errors.

In some cases, quantities of bit errors detected from times t10 through t14 may be successively increasing, which may indicate a higher likelihood of device degradation. Thus, a memory device may generate an error metric based on quantities of bit errors 410 and may determine whether the error metric satisfies one or more thresholds. For example, a static threshold 412 may correspond to a threshold of bit errors, and may be predetermined by the memory device or programmed (e.g., via a register) in the memory device by a host device. However, static thresholds may not account for process variability. For example, some devices may inherently have low quantities of bit errors while other devices (e.g., from other wafers, die locations on a wafer, process batches, or manufacturing lots) may inherently have higher quantities of bit errors. Thus, a threshold that is set with a tolerance level for those devices having higher quantities of bit errors may not detect unsatisfactory conditions for a device with inherently low quantities of errors. Additionally, in some cases it may be desirable to detect that conditions of a memory array are deteriorating prior to exceeding a quantity of errors that may be problematic within a given system (e.g., the static threshold 412). According to various aspects, the memory device may implement techniques for detecting deteriorating or unsatisfactory conditions of the memory array by determining the error metric as a function of multiple quantities of bit errors, or the use of one or more dynamic thresholds. In this case, the error metric may exceed a threshold before the quantity of bit errors reaches the static threshold 412 (e.g., maximum permissible quantity of bit errors), or for devices that may be experiencing relatively high quantities of bit errors but that are below the static threshold. That is, a memory device may determine that the trend in the quantity of bit errors from some quantity of measured quantities of bit errors (e.g., t10 through t14) indicates memory degradation and may accordingly transmit an alert to an external device.

In some cases, some or all of the quantities of bit errors 410 may be used to generate an error metric, such as by comparing a quantity of bit errors with a running average of the quantity of bit errors to determine a difference, or by determining a quantity of instances in which a quantity of bit errors 410 exceeds an average or running average of the quantity of bit errors 410. For example, the dynamic threshold 415 may be generated by adding an offset to a running average (e.g., three most recent measurements). The error metric may then be compared to the dynamic threshold 415, for example, and if it satisfies the threshold (e.g., for one or more measurements), it may indicate deteriorating or unsatisfactory conditions. In some cases, outlier quantities of bit errors (e.g., 410-k) may be excluded from the error metric by, for example, detecting a quantity of measurements exceeding the dynamic threshold or excluding measurements that differ from neighboring measurements by greater than a certain amount.

Example 402 may depict differences in quantities of bit errors, including differences 420-a, 420-b, 420-c, 420-d, 420-e, 420-f, corresponding to successive quantities of bit errors 410 shown in example 401. In some cases, some or all of the differences 420 in the quantities of bit errors may be used to generate an error metric, such as by comparing a difference in a quantity of bit errors with a threshold value 430, or with a difference 425 between differences 420 in the quantities of bit errors, or with a running average of the differences in the quantity of bit errors. In some cases, a memory device may generate an error metric based on a quantity of instances in which a difference in the quantity of bit errors 410 exceeds an average or running average of the difference 420 in the quantity of bit errors, or by comparing the slopes of differences 420 of quantities of bit errors across multiple time intervals. In some cases, the error metric may then be compared to one or more thresholds (e.g., static or dynamic thresholds), for example.

In one example, detection of deteriorating conditions may be made at time t11. For example, a most recently detected quantity of bit errors 410-*d* (e.g., a value of 380 in example 401) may be stored in counter 325 as described with reference to FIG. 3. The next most recently detected quantities of bit errors 410-*e*, 410-*f*, and 410-*g* (e.g., 210, 100, and 90 in example 401) may be stored in registers 335-*a*, 335-*b*, and 335-*c*, respectively.

In some cases, the most recently detected quantity of bit errors 410-*d* may be compared (e.g., by a comparison element 320) with quantities of bit errors in registers 335-*a*, 335-*b*, and 335-*c* to determine one or more differences in the quantity of bit errors. For example, a comparison element may compare the quantity of bit errors 410-*d* with the quantity of bit errors 410-*e* to determine a first difference. In example 402, the first difference may be 170 as shown by difference 420-*d*. The comparison element may compare the quantity of bit errors stored in register 335-*a* with a quantity of bit errors stored in register 335-*b* to determine a second difference. In example 402, the second difference may be 110 as shown by difference 420-*e*. The comparison element may compare the quantity of bit errors stored in register 335-*b* with a quantity of bit errors stored in register 335-*c* to determine a third difference. In example 401, the third difference may be 10 as shown by difference 420-*f*. Additionally or alternatively, in some cases, the most recent quantity of bit errors may be compared with other quantities of bit errors (e.g., to the quantities of bit errors in registers 335-*a*, 335-*b*, or 335-*c*) to determine the one or more differences in the quantity of bit errors.

In some cases, the error metric may be generated based on the first difference, the second difference, and/or the third difference, and/or on other differences between quantities of bit errors in counter 325 and registers 335-*a*, 335-*b*, and 335-*c*. In some cases, an error metric may represent a change or trend in the quantity of bit errors, which may provide an indication of the health of a memory device. Using one or more of these techniques on the quantities of bit errors at time t11 may, for example, detect deteriorating conditions and allow a host device to take action to mitigate the problem before the quantities of errors become problematic (e.g., higher than a static threshold, for example). As additional measurements of the quantities of bit errors 410-*c*, 410-*b*, and 410-*a* are determined by the memory device, the techniques may be continually performed, and the error metric updated and compared with the one or more thresholds. The status indicator may similarly be updated based on comparing the error metric to the one or more thresholds. In some cases, the status indicator may be sticky, that is it may change based comparison of the error metric to one or more thresholds to indicate lower levels of data integrity, but may not indicate higher data integrity even when the error metric no longer satisfies the corresponding threshold (e.g., until cleared by an external host device).

In example 402, the difference 420-*k* may be identified as an outlier difference because this difference (having a value of 260) is much greater than the two differences adjacent to it (having values of −10 and −270). Thus, the difference 420-*k* may be excluded from the error metric. For example, a difference may be excluded if it is a certain amount (e.g., 100, 200, 500) greater than the average the adjacent or surrounding differences.

An error metric may be calculated in a variety of ways. For example, an error metric may be set to be equal to the most recent difference (e.g., the first difference, 170). An error metric may be calculated as an average of multiple differences, excluding outlier differences (e.g., an average of 170, 110, 10, and −10, or an average of a subset of these values). An error metric may be calculated as a weighted average of multiple differences, in which each difference is assigned a weight based on, for example, the recency of the difference or other factors. An error metric may be calculated as a rate of change of two or more differences (e.g., as a change in the difference values, such as 170–110). The error metric may be based on a slope of the differences (e.g., a quantity of measurements for which the slope of the change in differences remains positive, which may indicate an exponentially increasing quantity of errors).

As described above, the memory device may output (e.g., to an external host device) a status indicator based on comparison of the error metric to one or more thresholds. In some examples, the various parameters used to generate the error metric or threshold(s) may be programmed on the memory device by a host (e.g., quantity and weights of quantities of errors or differences in quantities of errors, threshold values).

Examples 401 and 402 are intended to provide an illustration of the techniques described herein, and should not be considered representative of typical quantities of bit errors or quantity of values used for computing the bit error metric, nor should it be considered as limiting.

Figure 5:
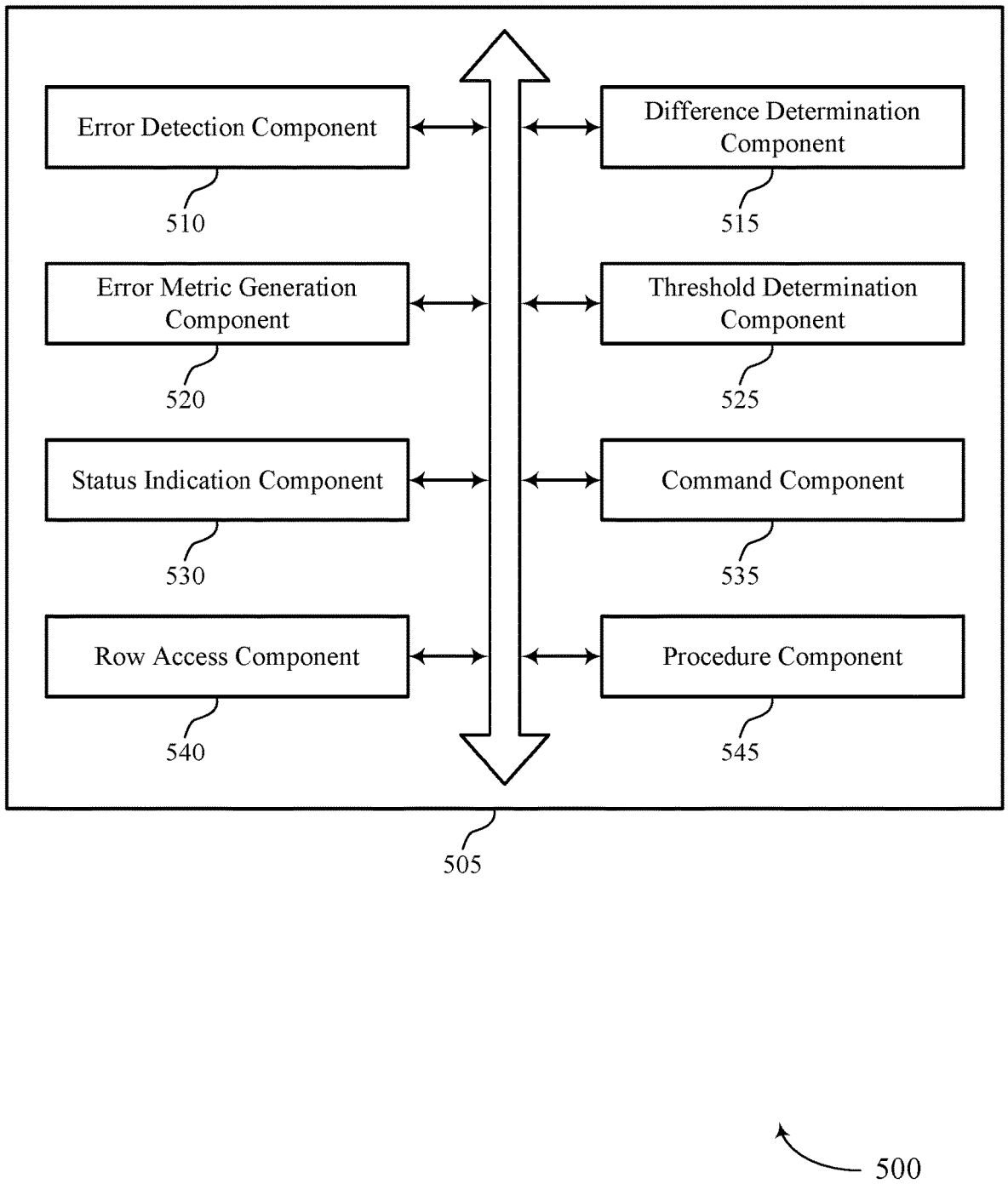
FIG. 5 shows a block diagram of a memory device that supports a memory error indicator for high-reliability applications in accordance with aspects of the present disclosure.

FIG. 5 shows a block diagram 500 of a memory device 505 that supports memory error indicator for high-reliability applications in accordance with examples as disclosed herein. The memory device 505 may be an example of aspects of a memory device as described with reference to FIGS. 1 through 3. The memory device 505 may include an error detection component 510, a difference determination component 515, an error metric generation component 520, a threshold determination component 525, a status indication component 530, a command component 535, a row access component 540, and a procedure component 545. Each of these modules may communicate, directly or indirectly, with one another (e.g., via one or more buses).

The error detection component 510 may detect, for each of the set of procedures, respective quantities of bit errors associated with the set of rows of the memory array based on error detection information.

The difference determination component 515 may determine a difference between two or more of the respective quantities of bit errors detected within the set of rows of the memory array. In some examples, determining the difference includes comparing a first one of the respective quantities of bit errors detected in the set of rows of the memory array with a second one of the respective quantities of bit errors detected in the set of rows of the memory array after the first one of the respective quantities of bit errors is detected.

In some examples, the difference determination component 515 may determine a set of differences in the respective quantities of bit errors detected in the memory array based on a set of stored values associated with the respective quantities of bit errors, the set of differences including the first difference.

The error metric generation component 520 may generate an error metric based on the difference. In some examples, the error metric generation component 520 may generate the error metric based on the set of differences.

In some examples, generating the error metric includes determining a change between the first difference and one or more additional differences of the set of differences.

In some examples, the error metric generation component 520 may determine that a second difference of the set of differences satisfies a condition for being an outlier relative to the one or more additional differences; where the error metric is generated independently of the second difference.

In some examples, the error metric generation component 520 may identify a first weight associated with the first difference. In some examples, the error metric generation component 520 may identify a second weight associated with a second difference of the set of differences, where the error metric is generated based on the first weight and the second weight.

The threshold determination component 525 may determine whether the error metric satisfies a threshold.

The status indication component 530 may output a status indicator based on determining whether the error metric satisfies the threshold.

In some examples, outputting the status indicator includes transmitting, by the memory device, the status indicator to a host device.

In some examples, outputting the status indicator includes storing the status indicator in a register on the memory device.

The procedure component 545 may perform, by a memory device, a set of procedures to read (or read and restore) states of cells of a set of rows of a memory array of the memory device.

The command component 535 may receive a set of refresh commands, where each of the set of procedures is performed in response to receiving one or more of the set of refresh commands.

In some examples, the command component 535 may receive a set of read commands.

The row access component 540 may access, based on the set of read commands, a quantity of rows of the memory array, where the set of procedures to read states of cells of the set of rows of the memory array are based on the accessing of the quantity of rows of the memory array.

In some examples, the error metric is generated based on a determination that the quantity of accessed rows satisfies a threshold quantity of rows.

Figure 6:
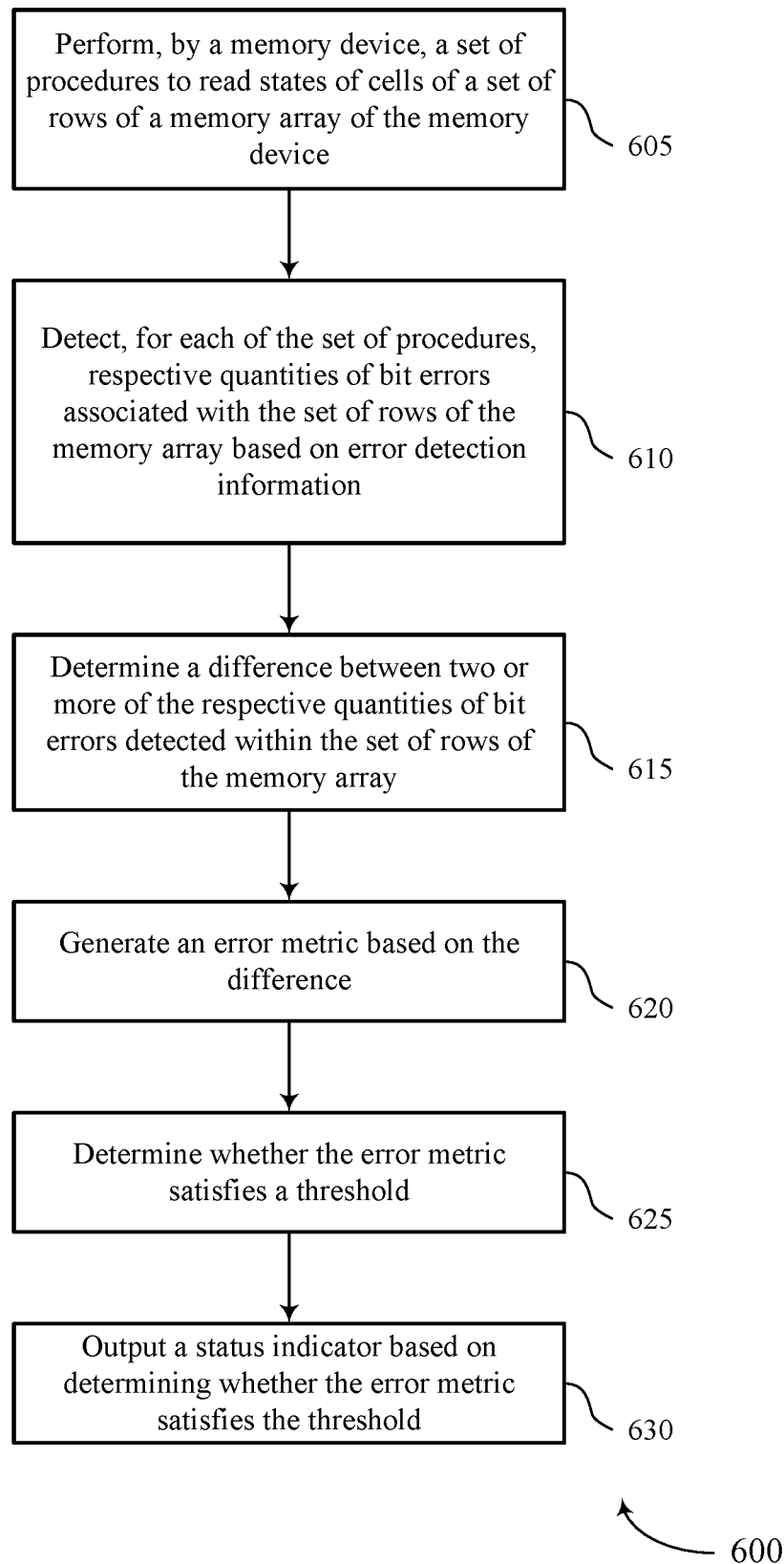
FIG. 6 shows a flowchart illustrating a method or methods that support a memory error indicator for high-reliability applications in accordance with examples as disclosed herein.

FIG. 6 shows a flowchart illustrating a method or methods 600 that supports a memory error indicator for high-reliability applications in accordance with aspects of the present disclosure. The operations of method 600 may be implemented by a memory device or its components as described herein. For example, the operations of method 600 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 605, the memory device may perform, by a memory device, a set of procedures to read (or read and restore) states of cells of a set of rows of a memory array of the memory device. The operations of 605 may be performed according to the methods described herein. In some examples, aspects of the operations of 605 may be performed by a procedure component as described with reference to FIG. 5.

At 610, the memory device may detect, for each of the set of procedures, respective quantities of bit errors associated with the set of rows of the memory array based on error detection information. The operations of 610 may be performed according to the methods described herein. In some examples, aspects of the operations of 610 may be performed by an error detection component as described with reference to FIG. 5.

At 615, the memory device may determine a difference between two or more of the respective quantities of bit errors detected within the set of rows of the memory array. The operations of 615 may be performed according to the methods described herein. In some examples, aspects of the operations of 615 may be performed by a difference determination component as described with reference to FIG. 5.

At 620, the memory device may generate an error metric based on the difference. The operations of 620 may be performed according to the methods described herein. In some examples, aspects of the operations of 620 may be performed by an error metric generation component as described with reference to FIG. 5.

At 625, the memory device may determine whether the error metric satisfies a threshold. The operations of 625 may be performed according to the methods described herein. In some examples, aspects of the operations of 625 may be performed by a threshold determination component as described with reference to FIG. 5.

At 630, the memory device may output a status indicator based on determining whether the error metric satisfies the threshold. The operations of 630 may be performed according to the methods described herein. In some examples, aspects of the operations of 630 may be performed by a status indication component as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for performing, by a memory device, a set of procedures to read states of cells of a set of rows of a memory array of the memory device, detecting, for each of the set of procedures, respective quantities of bit errors associated with the set of rows of the memory array based on error detection information, determining a difference between two or more of the respective quantities of bit errors detected within the set of rows of the memory array, generating an error metric based on the difference, determining whether the error metric satisfies a threshold, and outputting a status indicator based on determining whether the error metric satisfies the threshold.

In some examples of the method 600 and the apparatus described herein, determining the difference may include operations, features, means, or instructions for comparing a first one of the respective quantities of bit errors detected in the set of rows of the memory array with a second one of the respective quantities of bit errors detected in the set of rows of the memory array after the first one of the respective quantities of bit errors may be detected.

Some examples of the method 600 and the apparatus described herein may further include operations, features, means, or instructions for receiving a set of refresh commands, where each of the set of procedures may be performed in response to receiving one or more of the set of refresh commands.

Some examples of the method 600 and the apparatus described herein may further include operations, features, means, or instructions for determining a set of differences in the respective quantities of bit errors detected in the memory array based on a set of stored values associated with the respective quantities of bit errors, the set of differences including the first difference, and generating the error metric based on the set of differences.

In some examples of the method 600 and the apparatus described herein, generating the error metric may include operations, features, means, or instructions for determining a change between the first difference and one or more additional differences of the set of differences.

Some examples of the method 600 and the apparatus described herein may further include operations, features, means, or instructions for determining that a second difference of the set of differences satisfies a condition for being an outlier relative to the one or more additional differences; where the error metric may be generated independently of the second difference.

Some examples of the method 600 and the apparatus described herein may further include operations, features, means, or instructions for identifying a first weight associated with the first difference, and identifying a second weight associated with a second difference of the set of differences, where the error metric may be generated based on the first weight and the second weight.

Some examples of the method 600 and the apparatus described herein may further include operations, features, means, or instructions for receiving a set of read commands, accessing, based on the set of read commands, a quantity of rows of the memory array, where the set of procedures to read states of cells of the set of rows of the memory array may be based on the accessing of the quantity of rows of the memory array, and where the error metric may be generated based on a determination that the quantity of accessed rows satisfies a threshold quantity of rows.

Some examples of the method 600 and the apparatus described herein may further include operations, features, means, or instructions for outputting the status indicator includes transmitting, by the memory device, the status indicator to a host device.

In some examples of the method 600 and the apparatus described herein, outputting the status indicator may include operations, features, means, or instructions for storing the status indicator in a register on the memory device.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:

detecting, for one or more procedures performed on one or more rows of a memory array of a memory device, respective quantities of bit errors associated with the one or more rows of the memory array for the one or more procedures;

determining a difference between a first respective quantity of bit errors of the respective quantities of bit errors and a second respective quantity of bit errors of the respective quantities of bit errors;

generating an error metric based at least in part on the difference and two or more of the respective quantities of bit errors, the two or more of the respective quantities of bit errors exclusive of the first respective quantity of bit errors; and outputting a status indicator based at least in part on the error metric.

2. The method of claim 1, further comprising:
comparing the difference with a second determined difference between two other respective quantities of bit errors; and
determining that the first respective quantity of bit errors is an outlier quantity of bit errors based at least in part on comparing the difference with the second determined difference.

3. The method of claim 2, wherein determining that the first respective quantity of bit errors is the outlier quantity of bit errors further comprises:
determining that first respective quantity of bit errors satisfies a threshold change in a quantity of bit errors relative to another respective quantity of bit errors.

4. The method of claim 1, further comprising:
receiving one or more refresh commands, wherein at least one of the one or more procedures is a refresh procedure performed in response to at least one of the one or more refresh commands, and wherein detecting the respective quantities of bit errors is performed concurrently with performing the one or more refresh commands.

5. The method of claim 4, wherein performing the one or more procedures further comprises:
performing an activate operation followed by the refresh procedure followed by a pre-charge operation.

6. The method of claim 4, further comprising:
monitoring an elapsed time since at least one row of the one or more rows has been refreshed, wherein the refresh procedure is performed based at least in part on the monitoring.

7. The method of claim 4, wherein the respective quantities of bit errors are detected after the refresh procedure has been performed on a minimum quantity of rows of the one or more rows of the memory array.

8. The method of claim 7, wherein detecting the respective quantities of bit errors further comprises:
estimating the respective quantities of bit errors for the memory array based at least in part on performing the refresh procedure on the minimum quantity of rows, wherein the error metric is generated based at least in part on the estimate.

9. The method of claim 4, wherein each of the one or more refresh commands is associated with a respective refresh procedure, with each respective refresh procedure refreshing a respective subset of rows of the one or more rows of the memory array.

10. The method of claim 1, further comprising:
determining a plurality of differences in the respective quantities of bit errors, wherein the error metric is generated based at least in part on the plurality of differences.

11. The method of claim 10, further comprising: determining respective changes between the plurality of differences across respective time intervals corresponding to the plurality of differences, wherein the error metric is generated based at least in part on the respective changes between the plurality of differences.

12. The method of claim 1, further comprising:
comparing the error metric to one or more thresholds, wherein the status indicator is based at least in part on comparing the error metric to the one or more thresholds.

13. The method of claim 1, further comprising:
assigning a respective weight to each of the two or more of the respective quantities of bit errors exclusive of the first respective quantity of bit errors, wherein the error metric is generated based at least in part on the respective weights.

14. The method of claim 1, wherein outputting the status indicator further comprises:
outputting a magnitude of the difference between the two or more of the respective quantities of bit errors exclusive of the first respective quantity of bit errors.

15. A method comprising:
detecting, for one or more procedures on one or more rows of a memory array of a memory device, respective quantities of bit errors associated with the one or more rows of the memory array for the one or more procedures;
comparing a first respective quantity of bit errors of the respective quantities of bit errors to one or more other respective quantities of bit errors;
generating an error metric based at least in part on comparing the first respective quantity of bit errors of the respective quantities of bit errors to the one or more other respective quantities of bit errors and on two or more of the respective quantities of bit errors, the two or more of the respective quantities of bit errors exclusive of the first respective quantity of bit errors; and
outputting a status indicator based at least in part on the error metric.

16. The method of claim 15, further comprising:
determining a running average associated with the respective quantities of bit errors; and
determining which of the respective quantities of bit errors exceeds the running average, wherein the error metric is generated based at least in part on determining which of the respective quantities of bit errors exceeds the running average.

17. The method of claim 16, further comprising:
applying an offset to the running average to create a dynamic threshold; and
comparing the error metric against the dynamic threshold.

18. The method of claim 17, further comprising:
determining that the first respective quantity of bit errors is an outlier quantity of bit errors;
detecting, based at least in part on determining that the first respective quantity of bit errors is the outlier quantity of bit errors, that the first respective quantity of bit errors exceeds the dynamic threshold; or
detecting, based at least in part on determining that the first respective quantity of bit errors is the outlier quantity of bit errors, that the first respective quantity of bit errors differ from a plurality of quantity of bit errors in adjacent time periods by a determined amount.

19. A memory device, comprising:
a memory array;
a controller coupled with the memory array and operable to cause the memory device to:
detect, one or more procedures performed on one or more rows of the memory array of the memory device, respective quantities of bit errors associated with the one or more rows of the memory array for the one or more procedures;
determine a difference between a first respective quantity of bit errors of the respective quantities of bit errors and a second respective quantity of bit errors of the respective quantities of bit errors;
generate an error metric based at least in part on the difference and two or more of the respective quantities of bit errors, the two or more of the respective quantities of bit errors exclusive of the first respective quantity of bit errors; and output a status indicator based at least in part on the error metric.

20. The memory device of claim 19, wherein the controller is further operable to cause the memory device to:

store the respective quantities of bit errors in a buffer, wherein determining the difference is based at least in part on a comparison of stored bit errors in the buffer.

* * * * *